United States Patent
Endo

(10) Patent No.: US 10,593,936 B2
(45) Date of Patent: Mar. 17, 2020

(54) POSITIVE ELECTRODE FOR NONAQUEOUS ELECTROLYTE SECONDARY BATTERY AND NONAQUEOUS ELECTROLYTE SECONDARY BATTERY

(71) Applicant: Panasonic Corporation, Osaka (JP)

(72) Inventor: Kazuki Endo, Hyogo (JP)

(73) Assignee: Panasonic Corporation, Osaka (JP)

( * ) Notice: Subject to any disclaimer, the term of this patent is extended or adjusted under 35 U.S.C. 154(b) by 233 days.

(21) Appl. No.: 15/371,033

(22) Filed: Dec. 6, 2016

(65) Prior Publication Data
US 2017/0187036 A1    Jun. 29, 2017

(30) Foreign Application Priority Data
Dec. 25, 2015 (JP) ................ 2015-252976

(51) Int. Cl.
*H01M 4/36* (2006.01)
*H01M 10/0525* (2010.01)
(Continued)

(52) U.S. Cl.
CPC ........... *H01M 4/366* (2013.01); *H01M 4/131* (2013.01); *H01M 4/485* (2013.01); *H01M 4/661* (2013.01);
(Continued)

(58) Field of Classification Search
CPC ...... H01M 4/131; H01M 4/485; H01M 4/366; H01M 4/661; H01M 4/667; H01M 10/0585; H01M 10/0525; H01M 2004/028
See application file for complete search history.

(56) References Cited

U.S. PATENT DOCUMENTS

2004/0234850 A1* 11/2004 Watarai ................ H01M 4/131
                                                        429/217
2006/0141341 A1*  6/2006 Nishino .............. H01M 2/1653
                                                        429/62

(Continued)

FOREIGN PATENT DOCUMENTS

JP          2013-045659        3/2013
JP          2013045659 A   *   3/2013

OTHER PUBLICATIONS

WO 2012/005301 (Year: 2012).*
Translation of JP 2013-045659 (Year: 2013).*

*Primary Examiner* — Ula C Ruddock
*Assistant Examiner* — Matthew W Van Oudenaren
(74) *Attorney, Agent, or Firm* — McDermott Will & Emery LLP

(57) ABSTRACT

The positive electrode as an embodiment includes a positive electrode current collector mainly composed of aluminum, a positive electrode mixture layer containing a lithium-containing transition metal oxide and disposed above the positive electrode current collector, and a protective layer disposed between the positive electrode current collector and the positive electrode mixture layer. The protective layer contains inorganic particles, an electro-conductive material, and a binding material; is mainly composed of the inorganic particles; and is disposed on the positive electrode current collector to cover the positive electrode current collector in approximately the entire area where the positive electrode mixture layer is disposed and at least a part of the exposed portion of the positive electrode current collector where the positive electrode mixture layer is not disposed on the surface of the positive electrode current collector.

10 Claims, 2 Drawing Sheets

(51) Int. Cl.
*H01M 10/0585* (2010.01)
*H01M 4/485* (2010.01)
*H01M 4/66* (2006.01)
*H01M 4/131* (2010.01)
*H01M 4/02* (2006.01)

(52) U.S. Cl.
CPC ....... *H01M 4/667* (2013.01); *H01M 10/0525* (2013.01); *H01M 10/0585* (2013.01); *H01M 2004/028* (2013.01)

(56) References Cited

U.S. PATENT DOCUMENTS

| | | | | |
|---|---|---|---|---|
| 2007/0172736 | A1* | 7/2007 | Fujikawa | H01M 2/14 429/233 |
| 2009/0305128 | A1* | 12/2009 | Yeo | H01M 2/0202 429/174 |
| 2011/0045361 | A1* | 2/2011 | Abe | H01M 10/0568 429/343 |
| 2013/0089781 | A1* | 4/2013 | Miyazaki | H01M 4/131 429/211 |
| 2013/0147439 | A1* | 6/2013 | Takahashi | H01M 4/667 320/134 |

* cited by examiner

POSITIVE ELECTRODE FOR NONAQUEOUS ELECTROLYTE SECONDARY BATTERY AND NONAQUEOUS ELECTROLYTE SECONDARY BATTERY

BACKGROUND

1. Technical Field

The present disclosure relates to a positive electrode for a nonaqueous electrolyte secondary battery and a nonaqueous electrolyte secondary battery.

2. Description of the Related Art

A positive electrode for a nonaqueous electrolyte secondary battery (hereinafter, simply referred to as "positive electrode") includes a positive electrode current collector and a positive electrode mixture layer on the current collector. The positive electrode has a portion serving as a lead to be electrically connected to, for example, a positive electrode terminal, and the portion includes an exposed portion where the positive electrode mixture layer is not formed to expose the surface of the current collector. In order to secure smooth movement of lithium ions between positive and negative electrodes, the positive electrode is designed to be smaller than the negative electrode. In such a case, the exposed portion of the positive electrode current collector faces the negative electrode with a separator therebetween. If foreign matter enters between the exposed portion and the negative electrode and breaks through the separator, the exposed portion may come into contact with the negative electrode to cause a low-resistance internal short-circuit, which generates a flow of a large current and thereby generates large heat.

In order to avoid such a low-resistance internal short-circuit, for example, Japanese Unexamined Patent Application Publication No. 2013-45659 discloses a positive electrode including an insulating layer formed by applying a binder solution containing a binder resin and a solvent to the exposed portion of a positive electrode current collector.

However, since the insulating layer disclosed in Japanese Unexamined Patent Application Publication No. 2013-45659 is a thin film layer made of only a binder resin, the effect of preventing an internal short-circuit due to contamination of foreign matter is low. In particular, if the size of foreign matter is large, it is inferred that the effect of the insulating layer preventing an internal short-circuit is insufficient.

In addition, a nonaqueous electrolyte secondary battery is required to reduce the quantity of heat due to an internal short-circuit caused between the area of the positive electrode mixture layer and the negative electrode by, for example, nail sticking. It is, however, difficult to reduce the quantity of heat by the technology disclosed in Japanese Unexamined Patent Application Publication No. 2013-45659.

SUMMARY

In one general aspect, the techniques disclosed here feature a positive electrode for a nonaqueous electrolyte secondary battery, the positive electrode comprising a positive electrode current collector mainly composed of aluminum, a positive electrode mixture layer containing a lithium-containing transition metal oxide and disposed above the positive electrode current collector, and a protective layer disposed between the positive electrode current collector and the positive electrode mixture layer. The protective layer contains inorganic particles, an electro-conductive material, and a binding material and is mainly composed of the inorganic particles. The protective layer is disposed on the positive electrode current collector and covers the positive electrode current collector in approximately the entire area where the positive electrode mixture layer is disposed and at least a part of the exposed portion of the positive electrode current collector where the positive electrode mixture layer is not disposed on the surface of the positive electrode current collector.

The positive electrode for a nonaqueous electrolyte secondary battery according to one aspect of the present disclosure can highly suppress the occurrence of a low-resistance internal short-circuit between the positive electrode current collector and the negative electrode due to contamination of foreign matter, without deteriorating the battery characteristics. In addition, the quantity of heat can be suppressed, for example, when an internal short-circuit is caused by nail sticking or another cause.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
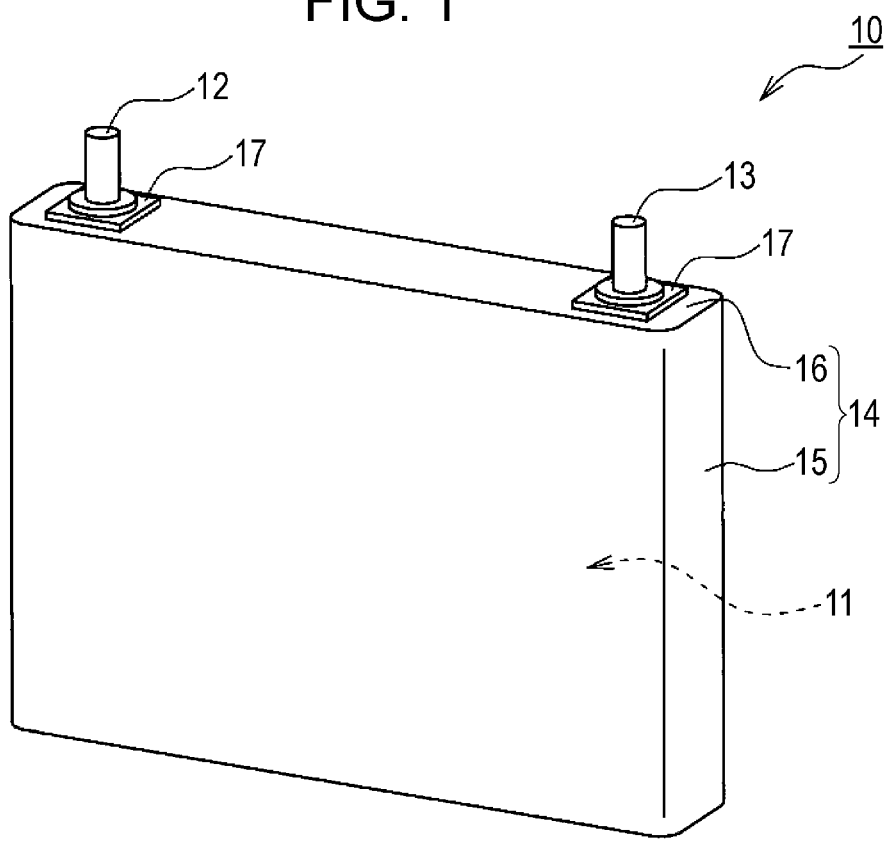
FIG. 1 is a perspective view illustrating a nonaqueous electrolyte secondary battery as an embodiment.

In a positive electrode as an embodiment of the present disclosure, a protective layer containing inorganic particles, an electro-conductive material, and a binding material and mainly composed of the inorganic particles is disposed on a positive electrode current collector in approximately the entire area where a positive electrode mixture layer is disposed and in an area protruding than the positive electrode mixture layer. That is, the protective layer not only lies between the positive electrode current collector and the positive electrode mixture layer but also covers at least a part of the exposed portion of the positive electrode current collector where the positive electrode mixture layer is not disposed to expose the surface of the positive electrode current collector. The protective layer is mainly composed of the inorganic particles and therefore is hard and is hardly broken and can be disposed with a thickness of 1 μm or more. Accordingly, the positive electrode as an embodiment of the present disclosure can highly suppress the occurrence of a low-resistance internal short-circuit by contamination of foreign matter between the positive electrode current collector and the negative electrode.

The occurrence of an internal short-circuit between the area where the positive electrode mixture layer is disposed and the negative electrode by, for example, nail sticking causes a risk of a redox reaction between a lithium-containing transition metal oxide as the positive electrode active material and aluminum (Al) as the main component of the aluminum current collector to generate large heat. The protective layer isolates the aluminum current collector from the lithium-containing transition metal oxide to prevent the redox reaction in which the aluminum current collector participates. The protective layer thus further functions to reduce the quantity of heat generated by occurrence of abnormality.

The protective layer having a thickness of 1 μm or more is desirably disposed on the current collector in order to prevent the redox reaction. A mere increase in the thickness of the protective layer significantly decreases the current collecting properties to cause a deterioration in battery performance. The present inventors have succeeded in maintenance of good battery characteristics by securing the current collecting properties through addition of an electro-conductive material to the protective layer. That is, the positive electrode as an embodiment of the present disclosure can highly suppress the occurrence of a low-resistance internal short-circuit without deteriorating the battery characteristics and can exhibit high safety against nail sticking.

An embodiment of the positive electrode and the non-aqueous electrolyte secondary battery according to the present disclosure will now be described in detail. The drawings referred to in explanation of the embodiment are schematic, and the dimension ratios of components and other factors shown in the drawings may be different from those of actual one. Specific dimensional ratios and other factors should be judged from the following descriptions. The term "approximately" in the specification is intended to, for example, in the example of "approximately the entire area", encompass "the entire area" and cases recognized as "substantially the entire area".

FIG. 1 is a perspective view illustrating a nonaqueous electrolyte secondary battery 10 as an embodiment. The nonaqueous electrolyte secondary battery 10 includes an electrode assembly 11 and a nonaqueous electrolyte (not shown). The electrode assembly 11 is composed of positive electrodes 20, negative electrodes 30, and separators 40, each of the separators 40 disposed between one of the positive electrodes 20 and one of the negative electrodes 30 (see FIG. 3 described below). The electrode assembly 11 is thus of a lamination type composed of the plurality of positive electrodes 20 and the plurality of negative electrodes 30 alternately stacked with the separators 40 therebetween. The positive electrode of the present disclosure may be applied to a wound-type electrode assembly.

The nonaqueous electrolyte secondary battery 10 is, for example, a lithium ion battery. The electrode assembly 11 as a power generating element and the nonaqueous electrolyte are accommodated in a battery container 14. The battery container 14 is generally composed of a container body 15 having an approximately box shape and a sealing body 16 sealing the opening of the container body 15. The nonaqueous electrolyte secondary battery 10 is, for example, a square battery. The container body 15 and the sealing body 16 are desirably made of a metal material of which the main component is aluminum. The battery container 14 can have a known structure. The term "main component (or mainly composed of)" refers to the component of which the content is the highest among the constitutional components.

On the sealing body 16, a positive electrode terminal 12 electrically connected to the positive electrodes 20 and a negative electrode terminal 13 electrically connected the negative electrodes 30 are disposed. The positive electrode terminal 12 is connected directly or via another conductive member to a positive electrode lead part 25 (see FIG. 3 described below) where the surface of the positive electrode current collector 21 is exposed. The negative electrode terminal 13 is connected directly or via another conductive member to a negative electrode lead part 35 (see FIG. 3 described below) where the surface of the negative electrode current collector 31 is exposed. Hereinafter, for convenience of explanation, the direction of arrangement of the positive electrode terminal 12 and the negative electrode terminal 13 is defined as the lateral direction, and the direction orthogonal to the lateral direction, i.e., the lamination direction of the electrodes constituting the electrode assembly 11, is defined as the vertical direction.

A through-hole (not shown) is disposed at each end of the sealing body 16 in the lateral direction. The positive electrode terminal 12 and the negative electrode terminal 13 or the conductive members connected to the terminals are inserted into the battery container 14 through the corresponding through-holes. The positive electrode terminal 12 and the negative electrode terminal 13 are fixed to the sealing body 16 with, for example, insulating members 17 provided to the through-holes. In general, the sealing body 16 has a gas discharge mechanism (not shown).

Each component of the nonaqueous electrolyte secondary battery 10, in particular, the electrode assembly 11 (especially, positive electrode 20) will now be described in detail with reference to FIGS. 2 to 4.

[Positive Electrode]

Figure 2:
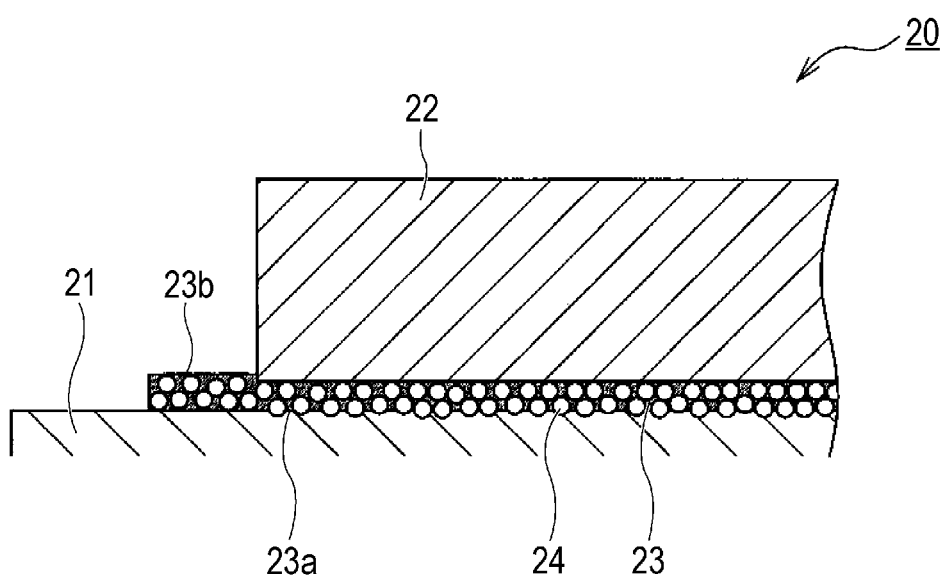
FIG. 2 is a cross-sectional view of a positive electrode as an embodiment.

FIG. 2 is a cross-sectional view of a positive electrode 20 as an embodiment. The positive electrode 20 includes a positive electrode current collector 21 mainly composed of aluminum (Al), a positive electrode mixture layer 22 containing a lithium-containing transition metal oxide and disposed above the positive electrode current collector 21, and a protective layer 23 disposed between the positive electrode current collector 21 and the positive electrode mixture layer 22. The positive electrode mixture layer 22 contains the lithium-containing transition metal oxide as the positive electrode active material and desirably further contains an electro-conductive material and a binding material. The positive electrode mixture layer 22 is generally disposed on each of both sides of the positive electrode current collector 21. The positive electrode 20 can be produced by, for example, applying a positive electrode mixture slurry containing a positive electrode active material, a binding material, and other materials onto the protective layer 23 disposed on the positive electrode current collector 21; drying the coating film; and then performing rolling to form a positive electrode mixture layer 22 on each of both sides of the current collector. The positive electrode mixture slurry is not coated to the positive electrode current collector 21 in the region becoming a positive electrode lead part 25. As a result, the positive electrode mixture layer 22 is not disposed in a part of the positive electrode 20 to form a positive electrode lead part 25 exposing the surface of the current collector.

The positive electrode current collector 21 is made of, for example, aluminum or an aluminum alloy. The content of aluminum in the positive electrode current collector 21 is 50% or more, desirably 70% or more, and more desirably 80% or more based on the total weight of the current collector. The positive electrode current collector 21 is, for example, metal foil of aluminum or an aluminum alloy having a thickness of about 10 to 100 μm.

Examples of the positive electrode active material include lithium transition metal oxides containing transition metal elements, such as cobalt (Co), manganese (Mn), and nickel (Ni). Examples of the lithium transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and Li$_2$MPO$_4$F (M: at least one of Na, Mg, Sc, Y, Mn, Fe, Co, Ni, Cu, Zn, Al, Cr, Pb, Sb, and B, 0<x≤1.2, 0<y≤0.9, 2.0≤z≤2.3). These metal oxides may be used alone or as a mixture of two or more thereof.

The electro-conductive material contained in the positive electrode mixture layer 22 enhances the electrical conductivity of the mixture layer. Examples of the electro-conductive material include carbon materials such as carbon black (CB), acetylene black (AB), Ketjen black, and graphite. These electro-conductive materials may be used alone or in combination of two or more thereof.

The binding material contained in the positive electrode mixture layer 22 maintains good contact between the positive electrode active material and the electro-conductive material and enhances the binding properties of, for example, the positive electrode active material to the surface of the current collector. Examples of the binding material include fluororesins, such as polytetrafluoroethylene (PTFE) and polyvinylidene fluoride (PVdF); polyacrylonitrile (PAN); polyimide resins; acrylic resins; and polyolefin resins. These resins may be used in combination with, for example, carboxymethyl cellulose (CMC) or its salt (which is, for example, CMC-Na, CMC-K, or CMC-NH$_4$ or may be a partially neutralized salt) or polyethylene oxide (PEO). These binding materials may be used alone or in combination of two or more thereof.

The protective layer 23 includes inorganic particles 24, an electro-conductive material, and a binding material and is mainly composed of the inorganic particles 24. The inorganic particles 24 are the component having a weight that is the largest among the components constituting the protective layer 23. The electro-conductive material enhances the electrical conductivity of the protective layer 23. The binding material binds the inorganic particles 24 to the electro-conductive material and binds the inorganic particles 24 and other components to the surface of the current collector. The protective layer 23 is disposed on the positive electrode current collector 21, and the positive electrode mixture layer 22 is disposed on the protective layer 23. As described above, since the positive electrode mixture layer 22 is disposed on each of both sides of the positive electrode current collector 21, the protective layer 23 is desirably disposed on each of both surfaces of the positive electrode current collector 21.

The protective layer 23 is disposed on the positive electrode current collector 21 in approximately the entire area where the positive electrode mixture layer 22 is disposed and in an area protruding than the positive electrode mixture layer 22. Hereinafter, the portion of the protective layer 23 located in the area where the positive electrode mixture layer 22 is disposed and disposed between the positive electrode current collector 21 and the positive electrode mixture layer 22 is defined as first region 23a, and the portion of the protective layer 23 protruding than the edge of the positive electrode mixture layer 22 is defined as second region 23b. The first region 23a and the second region 23b are successively disposed without being broken. In this embodiment, the second region 23b is disposed on the base side of the positive electrode lead part 25.

The first region 23a isolates the positive electrode current collector 21 mainly composed of aluminum from the lithium transition metal oxide to suppress the redox reaction involving the positive electrode current collector 21 and to reduce the quantity of heat due to an internal short-circuit caused by, for example, nail sticking. The safety against nail sticking of the battery is thus improved. The second region 23b highly suppresses the occurrence of a low-resistance internal short-circuit between the part of the positive electrode current collector 21 where the positive electrode mixture layer 22 is not disposed and the negative electrode 30. The second region 23b is a hard layer mainly composed of inorganic particles 24 and is therefore hardly broken even if contaminating foreign matter is strongly abutted against the second region 23b.

The protective layer 23 desirably has a thickness of 1 to 20 μm and more desirably 1 to 10 μm. Since the protective layer 23 contains an electro-conductive material, even if the protective layer 23 has a large thickness, the electrical conductivities of the positive electrode current collector 21 and the positive electrode mixture layer 22 are not deteriorated, and good battery characteristics can be maintained. However, since a too large thickness of the protective layer 23 may reduce the battery capacity, the thickness of the protective layer 23 is desirably 20 μm or less. The surface density of the protective layer 23, i.e., the weight per unit area of the protective layer 23 on the positive electrode current collector 21, is desirably 0.1 to 50 g/m$^2$ and more desirably 1 to 20 g/m$^2$.

In the example shown in FIG. 2, the first region 23a and the second region 23b differ in thickness. The thickness of the first region 23a is smaller than that of the second region 23b, and in the first region 23a, the inorganic particles 24 sink in the positive electrode current collector 21. Such a difference in thickness is disposed, for example, in the step of rolling the positive electrode 20 by not abutting the roller for rolling against the region where the positive electrode mixture layer 22 is not disposed and not applying a pressure to the region. A reduction in the thickness of the first region 23a prevents deterioration of the electrical conductivities of the positive electrode current collector 21 and the positive electrode mixture layer 22. The sinking of the inorganic particles 24 into the positive electrode current collector 21 advantageously enhances the binding properties between the first region 23a and the positive electrode current collector 21. The second region 23b having a larger thickness has a higher effect of preventing the internal short-circuit by contamination of foreign matter.

The inorganic particles 24 contained in the protective layer 23 are desirably mainly composed of an inorganic compound having a specific resistance of 1×10$^3$ Ω·m or more. The use of an inorganic compound having a specific resistance of 1×10$^3$ Ω·m or more suppresses occurrence of a low-resistance internal short-circuit generating a flow of a large current. The content of the inorganic particles 24 is desirably 70 to 99.8 wt %, most desirably 90 to 99 wt %, based on the total weight of the protective layer 23.

Desired examples of the inorganic particles 24 include at least one selected from aluminum oxide, titanium oxide, manganese oxide, and silicon oxide. In particular, aluminum oxide (Al$_2$O$_3$) or titanium oxide (TiO$_2$) is desirably used. The inorganic particles 24 have an average particle diameter of, for example, 1 μm or less and desirably 0.3 to 1 μm. The term "average particle diameter" herein refers to the volume average particle diameter measured by a light scattering method.

The electro-conductive material contained in the protective layer 23 can be the same type as that of the electro-conductive material applied to the positive electrode mixture layer 22. For example, carbon materials, such as carbon black (CB), acetylene black (AB), Ketjen black, and graphite, can be used. These electro-conductive materials may be used alone or in combination of two or more thereof. The content of the electro-conductive material is desirably 0.1 to 20 wt %, particularly desirably 1 to 10 wt %, based on the total weight of the protective layer 23. The content rate of the electro-conductive material in the protective layer 23 is higher than that of the electro-conductive material in, for example, the positive electrode mixture layer 22.

The binding material contained in the protective layer 23 can be the same type as that of the binding material applied to the positive electrode mixture layer 22. For example, fluororesins, such as polytetrafluoroethylene (PTFE) and polyvinylidene fluoride (PVdF); polyacrylonitrile (PAN); polyimide resins; acrylic resins; and polyolefin resins can be used. These binding materials may be used alone or in combination of two or more thereof. The content of the binding material is desirably 0.1 to 20 wt %, particularly desirably 1 to 10 wt %, based on the total weight of the protective layer 23.

Figure 3:
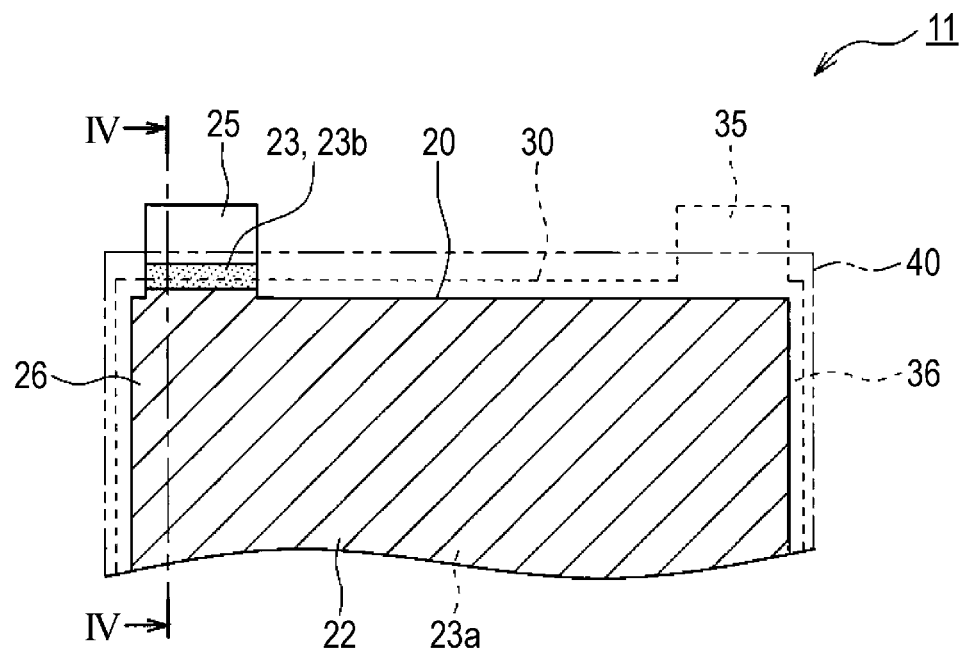
FIG. 3 is a diagram illustrating the layered structure of an electrode assembly as an embodiment.
Figure 4:
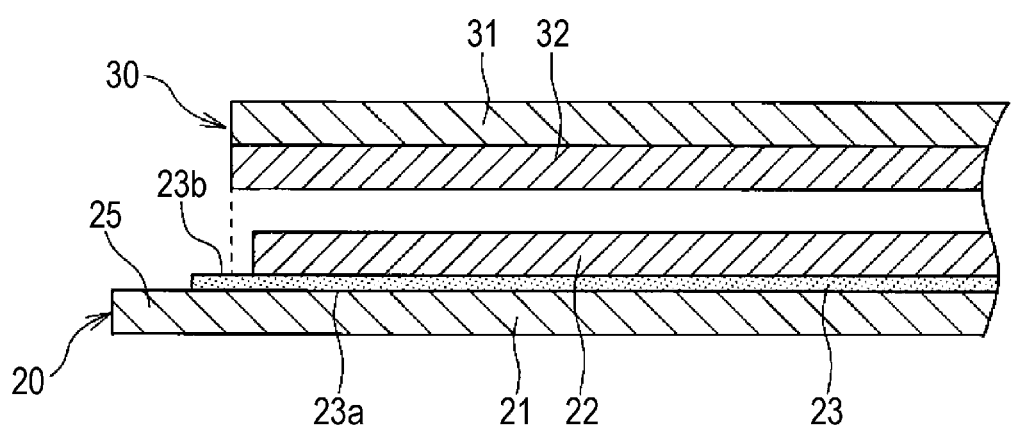
FIG. 4 is a cross-sectional view taken along line IV-IV in FIG. 3.

FIGS. 3 and 4 are diagrams illustrating the layered structure of the electrode assembly 11. In FIG. 3, the negative electrode 30 is shown by the broken line, and the separator 40 is shown by the two-dot line. In FIG. 4, the separator 40 is not shown. The electrode assembly 11 has a layered structure composed of positive electrodes 20 and negative electrodes 30 alternately stacked with separators 40 therebetween. As described above, in order to secure smooth movement of lithium ions between positive and negative electrodes, the positive electrode 20 is smaller than the negative electrode 30, and the positive electrode 20 and the negative electrode 30 are arranged such that at least the positive electrode mixture layer 22 faces the negative electrode mixture layer 32.

The positive electrode 20 includes a positive electrode lead part 25 disposed of a protruding part of the positive electrode current collector 21. The positive electrode 20 includes a body part 26 having, for example, a nearly rectangular shape in front view and the positive electrode lead part 25 protruding from one end of the body part 26 in the vertical direction and having a nearly rectangular shape in planar view. The positive electrode mixture layer 22 is disposed in approximately the entire area of the body part 26 on each of both sides of the body part 26 and also in a narrow area of the base of the positive electrode lead part 25. In other words, the positive electrode mixture layer 22 is not disposed in the large part of the positive electrode lead part 25. The positive electrode lead parts 25 of the individual positive electrodes 20 are stacked at the portion where the surface of each of the current collectors is exposed and are connected to the positive electrode terminal 12.

The negative electrode 30 includes a negative electrode lead part 35 disposed of a protruding part of the negative electrode current collector 31. The negative electrode 30 includes a body part 36 having, for example, a nearly rectangular shape in front view and the negative electrode lead part 35 protruding from one end of the body part 36 in the vertical direction and having a nearly rectangular shape in planar view. The negative electrode lead parts 35 of the individual negative electrodes 30 are stacked at the portion where the surface of each of the current collectors is exposed and are connected to the negative electrode terminal 13. In this embodiment, the positive electrode lead parts 25 are arranged at one end side of the electrode assembly 11 in the lateral direction, and the negative electrode lead parts 35 are arranged at the other end side of the electrode assembly 11 in the lateral direction. The positive electrode lead part 25 extends than the area facing the negative electrode 30 in the vertical direction.

The protective layer 23 is disposed in approximately the entire area of the body part 26 on each of both sides of the body part 26 and is also disposed in the area in the positive electrode lead part 25 where the positive electrode mixture layer 22 is not disposed so as to protrude than the edge of the positive electrode mixture layer 22. The second region 23b, which is the portion of the protective layer 23 protruding than the edge of the positive electrode mixture layer 22, may be disposed only in the area facing the negative electrode 30 or may be desirably disposed in an area beyond the area facing the negative electrode 30 considering positional displacement of the positive and negative electrodes. In the example shown in FIG. 3, the protective layer 23 is disposed in the area of about one-third of the length from the base of the positive electrode lead part 25 in the vertical direction. The surface of the current collector is exposed in the area of about two-thirds from the front end of the positive electrode lead part 25. The protective layer 23 may have any positional relationship with the separator 40, as long as being disposed beyond the area facing the negative electrode 30. The protective layer 23 is disposed in the area where the positive electrode lead part 25 concentrating the current on the plate faces the negative electrode 30, and thereby the safety in contamination of foreign matter can be further enhanced.

[Negative Electrode]

The negative electrode 30 includes, as described above, a negative electrode current collector 31 of, for example, metal foil and a negative electrode mixture layer 32 disposed on the current collector. The negative electrode current collector 31 can be, for example, foil of a metal that is stable in the potential range of the negative electrode 30, such as copper, or a film having a surface layer of such a metal. The negative electrode mixture layer 32 desirably contains a binding material, in addition to the negative electrode active material. The negative electrode mixture layer 32 is generally disposed on each of both sides of the negative electrode current collector 31. The negative electrode 30 can be produced by, for example, applying a negative electrode mixture slurry containing a negative electrode active material, a binding material, and other components onto a negative electrode current collector 31, drying the coating film, and then performing rolling to form a negative electrode mixture layer 32 on each surface of the current collector. The negative electrode mixture slurry is not coated to the negative electrode current collector 31 in the region becoming a negative electrode lead part 35. As a result, the negative electrode mixture layer 32 is not disposed in a part of the negative electrode 30 to form a negative electrode lead part 35 exposing the surface of the current collector.

The negative electrode active material may be any material that can reversibly occlude and discharge lithium ions. Examples of such negative electrode active materials include carbon materials, such as natural graphite and artificial graphite; metals alloying with lithium, such as silicon (Si) and tin (Sn); and alloys or complex oxides containing metal elements such as Si and Sn. The negative electrode active materials may be used alone or in combination of two or more thereof.

Examples of the binding material contained in the negative electrode mixture layer 32 include, as in the positive electrode, fluororesins, PAN, polyimide resins, acrylic resins, and polyolefin resins. In the case of using an aqueous solvent for preparing the negative electrode mixture slurry, for example, styrene-butadiene rubber (SBR), CMC or its salt, polyacrylic acid (PAA) or its salt (which is, for example, PAA-Na or PAA-K or may be a partially neutralized salt), and polyvinyl alcohol (PVA) are desirably used.

[Separator]

The separator 40 used is a porous sheet having ionic permeability and insulation properties. Examples of the porous sheet include micro-porous thin films, woven fabric, and non-woven fabric. Desired materials of the separator are, for example, olefin resins, such as polyethylene and polypropylene, and cellulose. The separator may be a laminate including a cellulose fiber layer and a thermoplastic resin fiber layer made of, for example, an olefin resin. The separator may be a multilayer separator including a polyethylene layer and a polypropylene layer or may have a surface onto which an aramid resin is applied.

A filler layer containing an inorganic filler may be disposed in the interface between the separator 40 and the positive electrode 20 and/or between the separator 40 and the negative electrode 30. Examples of the inorganic filler include oxides containing at least one selected from titanium (Ti), aluminum (Al), silicon (Si), and magnesium (Mg); and phosphate compounds. The filler layer can be disposed by, for example, applying a slurry containing the filler onto the surface of the positive electrode 20, the negative electrode 30, or the separator 40.

[Nonaqueous Electrolyte]

The nonaqueous electrolyte includes a nonaqueous solvent and an electrolyte salt dissolved in the nonaqueous solvent. The nonaqueous electrolyte is not limited to liquid electrolytes (nonaqueous electrolytic solutions) and may be a solid electrolyte, such as a gelled polymer. Examples of the nonaqueous solvent include esters; ethers; nitriles, such as acetonitrile; amides, such as dimethylformamide; and solvent mixtures of two or more thereof. The nonaqueous solvent may contain a halogen substitution product of the solvent of which at least a part of the hydrogen atoms is substituted with halogen atoms, such as fluorine.

Examples of the esters include cyclic carbonates, such as ethylene carbonate (EC), propylene carbonate (PC), and butylene carbonate; chain carbonates, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates, such as γ-butyrolactone and γ-valerolactone; and chain carboxylates, such as methyl acetate, ethyl acetate, propyl acetate, methyl propionate (MP), ethyl propionate, and γ-butyrolactone.

Examples of the ethers include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Desired examples of the halogen substitution product include fluorinated cyclic carbonates, such as fluoroethylene carbonate (FEC); fluorinated chain carbonates; and fluorinated chain carboxylates, such as methyl fluoropropionate (FMP).

The electrolyte salt is desirably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $LiP(C_2O_4)F_4$, $LiPF_{6-x}(C_nF_{2n+1})_x$ (1<x<6, n=1 or 2), $LiB_{10}Cl_{10}$, LiCl, LiBr, LiI, chloroborane lithium, lower aliphatic lithium carboxylate, borates such as $Li_2B_4O_7$ and $Li(B(C_2O_4)F_2)$, and imides such as $LiN(SO_2CF_3)_2$ and $LiN(C_lF_{2l+1}SO_2)(C_mF_{2m+1}SO_2)$ (where, l and m each represent an integer of 1 or more). Lithium salts may be used alone or as a mixture of two or more thereof. Among these lithium salts, $LiPF_6$ is desired from the viewpoint of ionic conductivity, electrochemical stability, and other factors. The concentration of the lithium salt is desirably 0.8 to 1.8 mol for 1 L of the nonaqueous solvent.

EXAMPLES

The present disclosure will now be described in more detail by examples, but is not limited to the following examples.

Example 1

Production of Positive Electrode

Aluminum oxide ($Al_2O_3$, 93.5 parts by weight), acetylene black (AB, 5 parts by weight), and polyvinylidene fluoride (PVdF, 1.5 parts by weight) were mixed. An appropriate amount of N-methyl-2-pyrrolidone (NMP) was further added to the mixture to prepare a slurry. The slurry was then applied onto both surfaces of a long positive electrode current collector of aluminum foil having a thickness of 15 μm and was dried to form a protective layer having a thickness of 6 μm and a surface density of 10 g/m².

A lithium-containing transition metal oxide (97 parts by weight) represented by $LiNi_{0.5}Co_{0.2}Mn_{0.3}O_2$ serving as a positive electrode active material, acetylene black (AB, 2 parts by weight), and polyvinylidene fluoride (PVdF, 1 part by weight) were mixed. An appropriate amount of N-methyl-2-pyrrolidone (NMP) was further added to the mixture to prepare a positive electrode mixture slurry. The positive electrode mixture slurry was then applied to the surfaces of the protective layers disposed on the positive electrode current collector and was dried. The resulting product was rolled with a roller and was then cut into a predetermined electrode size to produce positive electrodes each composed of a positive electrode mixture layer, a protective layer, a positive electrode current collector, a protective layer, and a positive electrode mixture layer disposed in this order.

In the cutting step, the positive electrode was disposed so as to include a body part having a nearly rectangular shape in planar view and a positive electrode lead part protruding from the edge of the body part. The protective layer and the positive electrode mixture layer were disposed in approximately the entire area of the body part. In the positive electrode lead part, the protective layer was disposed in the area of about one-third of the length from the base of the positive electrode lead part in the vertical direction. The surface of the positive electrode current collector was exposed in the area of about two-thirds from the front end of the positive electrode lead part. The positive electrode mixture layer was disposed in a small area of the base of the positive electrode lead part and its vicinity. The positive electrode had the same shape as that shown in FIG. 3.

[Production of Negative Electrode]

A graphite powder (98.7 parts by weight), carboxymethyl cellulose (CMC, 0.7 parts by weight), and styrene-butadiene rubber (SBR, 0.6 parts by weight) were mixed. An appropriate amount of water was further added to the mixture to prepare a negative electrode mixture slurry. The negative electrode mixture slurry was then applied onto both surfaces of a long negative electrode current collector of copper foil and was dried. The resulting product was rolled with a roller and was then cut into a predetermined electrode size to produce negative electrodes each composed of a negative electrode mixture layer, a negative electrode current collector, and a negative electrode mixture layer disposed in this order. The negative electrode includes a body part and a negative electrode lead part as in the positive electrode.

[Preparation of Nonaqueous Electrolyte]

Ethylene carbonate (EC), ethyl methyl carbonate (EMC), and dimethyl carbonate (DMC) were mixed at a volume ratio of 3:3:4. $LiPF_6$ was dissolved in this solvent mixture at a concentration of 1.2 mol/L to prepare a nonaqueous electrolytic solution.

[Production of Battery]

The positive electrodes and the negative electrodes were alternately stacked with a polyethylene separator therebetween to produce a lamination type electrode assembly. The numbers of the laminated positive electrodes and the negative electrodes were each 16. The positive electrode lead parts of the positive electrodes were arranged at one end side of the electrode assembly in the lateral direction, and the negative electrode lead parts of the negative electrodes were arranged at the other end side of the electrode assembly in the lateral direction. On this occasion, the positive electrodes and the negative electrodes were stacked in such a manner that the second region of the protective layer protruding than the edge of the positive electrode mixture layer extended than the area of the positive electrode lead part where the negative electrode faces. The electrode assembly was accommodated in a container body having an approximately box shape, and the nonaqueous electrolyte solution was then poured in the container body. The lead parts were connected to the positive electrode terminal and the negative electrode terminal, respectively, of the sealing body, and the opening of the container body was sealed by the sealing body to produce a square battery including a lamination type electrode assembly.

Example 2

A battery was produced as in Example 1 except that the protective layer had a surface density of 5 $g/m^2$ and a thickness of 3 μm.

Example 3

A battery was produced as in Example 1 except that the protective layer had a surface density of 1.6 $g/m^2$ and a thickness of 1 μm.

Example 4

A battery was produced as in Example 2 except that titanium oxide ($TiO_2$) was used instead of aluminum oxide ($Al_2O_3$).

Comparative Example 1

A battery was produced as in Example 1 except that the protective layer was disposed without using aluminum oxide ($Al_2O_3$) and acetylene black (AB).

Comparative Example 2

A battery was produced as in Example 1 except that the protective layer was disposed without using aluminum oxide ($Al_2O_3$) and using a graphite powder instead of black acetylene black (AB).

[Foreign Matter Short-Circuit Test]

The batteries produced above were each tested by the following procedure:

(1) Each battery was charged with a constant current of 0.3 C (600 mA) to a battery voltage of 4.2 V under an environment of a temperature of 25° C. and was continuously charged at a constant voltage of 4.2 V until the current value reached 0.05 C (90 mA);

(2) The container of the battery charged in the step (1) was disassembled to take out the electrode assembly. A nickel piece (L-shape, each side having a length of 1 mm, a height of 0.2 mm, and a width of 0.1 mm) was inserted in the positive electrode lead part at a portion of the second region 23b of the protective layer facing the negative electrode, and a pressure was applied to the portion where the nickel piece was inserted; and (3) Whether the pressure application caused combustion or not was investigated.

[Nail Sticking Test]

Each battery was tested by the following procedure:

(1) Each battery was charged with a constant current of 0.3 C (600 mA) to a battery voltage of 4.2 V under an environment of a temperature of 25° C. and was continuously charged at a constant voltage of 4.2 V until the current value reached 0.05 C (90 mA);

(2) The tip of a wire nail having a diameter of 3 mm was brought into contact with the central portion of the side face of the battery charged in the step (1) under an environment of a temperature of 25° C. The wire nail was stuck into the battery at a rate of 10 mm/sec along the diameter direction, and the sticking of the wire nail was stopped at the time the wire nail completely pierced the battery; and (3) The battery temperature was measured at a position 10 mm apart from the central portion of the side face of the battery at which the wire nail was stuck to determine the highest temperature of the battery.

TABLE 1

| | Thickness of protective layer | Surface density of protective layer | Foreign matter short-circuit test | Highest temperature of battery |
|---|---|---|---|---|
| Example 1 | 6 μm | 10 $g/m^2$ | No combustion | 523° C. |
| Example 2 | 3 μm | 5 $g/m^2$ | No combustion | 556° C. |
| Example 3 | 1 μm | 1.6 $g/m^2$ | No combustion | 598° C. |
| Example 4 | 3 μm | 5 $g/m^2$ | No combustion | 575° C. |
| Comparative Example 1 | 0.1 μm | 0.2 $g/m^2$ | Combustion | 683° C. |
| Comparative Example 2 | 1 μm | 2 $g/m^2$ | Combustion | 665° C. |

As shown in Table 1, all of the batteries of Examples did not cause combustion in the foreign matter short-circuit test and exhibited the highest temperatures drastically lower than those of the batteries in Comparative Examples in the nail sticking test. Combustion was observed in the batteries of Comparative Examples in the foreign matter short-circuit test. The batteries of Examples can highly suppress the occurrence of a low-resistance internal short-circuit by contamination of foreign matter between the positive electrode current collector and the negative electrode and also can sufficiently suppress the quantity of heat when an internal short-circuit is caused by nail sticking.

The positive electrode for a nonaqueous electrolyte secondary battery of the present disclosure is not limited to the above-described embodiments and has, for example, a configuration described in the following aspects:

[Aspect 1]
A positive electrode for a nonaqueous electrolyte secondary battery, comprising:
a positive electrode current collector mainly composed of aluminum;
a positive electrode mixture layer containing a lithium-containing transition metal oxide and disposed above the positive electrode current collector; and
a protective layer disposed between the positive electrode current collector and the positive electrode mixture layer, wherein
the protective layer contains an inorganic particle, an electro-conductive material, and a binding material and is mainly composed of the inorganic particle; and
the protective layer is disposed on the positive electrode current collector and covers the positive electrode current collector in approximately the entire area where the positive electrode mixture layer is disposed and at least a part of the exposed portion of the positive electrode current collector where the positive electrode mixture layer is not disposed on the surface of the positive electrode current collector;
[Aspect 2]
The positive electrode for a nonaqueous electrolyte secondary battery according to Aspect 1, wherein the inorganic particle is mainly composed of an inorganic compound having a specific resistance of $10^3$ Ω·m or more;
[Aspect 3]
The positive electrode for a nonaqueous electrolyte secondary battery according to Aspect 1 or 2, wherein the protective layer has a weight per unit area of 0.1 to 50 g/m$^2$;
[Aspect 4]
The positive electrode for a nonaqueous electrolyte secondary battery according to any one of Aspects 1 to 3, wherein the protective layer has a thickness of 1 to 20 μm;
[Aspect 5]
The positive electrode for a nonaqueous electrolyte secondary battery according to any one of Aspects 1 to 4, wherein the inorganic particle is of at least one selected from aluminum oxide, titanium oxide, manganese oxide, and silicon oxide;
[Aspect 6]
A nonaqueous electrolyte secondary battery comprising:
a positive electrode according to any one of Aspects 1 to 5;
a negative electrode;
a separator disposed between the positive electrode and the negative electrode; and
a nonaqueous electrolyte, wherein
the protective layer is arranged so as to face the negative electrode with the separator therebetween;
[Aspect 7]
The nonaqueous electrolyte secondary battery according to Aspect 6, comprising a plurality of the positive electrodes, a plurality of the negative electrodes, and a plurality of the separators, and having a lamination type electrode assembly composed of the positive electrodes and the negative electrodes alternately stacked with the separators therebetween;
[Aspect 8]
The nonaqueous electrolyte secondary battery according to Aspect 7, wherein
the positive electrodes each include a positive electrode lead part disposed in a part of the positive electrode current collector by not coating the positive electrode mixture layer; and
the protective layer is disposed on the positive electrode lead part; and

[Aspect 9]
The nonaqueous electrolyte secondary battery according to Aspect 8, wherein the protective layer is disposed on the positive electrode current collector in an area beyond the area facing the negative electrode.

What is claimed is:

1. A positive electrode for a nonaqueous electrolyte secondary battery, comprising:
a positive electrode current collector mainly composed of aluminum;
a positive electrode mixture layer containing a lithium-containing transition metal oxide and disposed above the positive electrode current collector; and
a protective layer disposed between the positive electrode current collector and the positive electrode mixture layer, wherein:
the protective layer contains inorganic particles, an electro-conductive material, and a binding material and is mainly composed of the inorganic particles by weight, and
the protective layer is disposed on the positive electrode current collector and covers the positive electrode current collector in a covered area where the positive electrode mixture layer is disposed and at least a part of an exposed portion of the positive electrode current collector where the positive electrode mixture layer is not disposed on the surface of the positive electrode current collector,
an amount of the binding material is 0.1% to 10% by weight with respect to a total weight of the protective layer,
an amount of the inorganic particles is 70% to 99% by weight with respect to the total weight of the protective layer, and
the protective layer has a weight per unit area of 0.1 g/m$^2$ to 20 g/m$^2$.

2. The positive electrode according to claim 1, wherein the inorganic particles are made of an inorganic compound having a specific resistance of $10^3$ Ω·m or more.

3. The positive electrode according to claim 1, wherein the protective layer has a thickness of 1 μm to 20 μm.

4. The positive electrode according to claim 1, wherein the inorganic particles are made of at least one selected from aluminum oxide, titanium oxide, manganese oxide, and silicon oxide.

5. A nonaqueous electrolyte secondary battery comprising:
the positive electrode according to claim 1;
a negative electrode;
a separator disposed between the positive electrode and the negative electrode; and
a nonaqueous electrolyte, wherein
the protective layer is arranged so as to face the negative electrode with the separator therebetween.

6. The nonaqueous electrolyte secondary battery according to claim 5, wherein:
a plurality of positive electrodes, a plurality of negative electrodes, and a plurality of separators are provided, and
the nonaqueous electrolyte secondary battery includes a lamination type electrode assembly composed of the plurality of positive electrodes and the plurality of negative electrodes alternately stacked with the plurality of separators therebetween, respectively.

7. The nonaqueous electrolyte secondary battery according to claim 6, wherein:
each of the plurality of positive electrodes includes a positive electrode lead part disposed in a part of the positive electrode current collector by not coating the positive electrode mixture layer, and the protective layer is disposed on the positive electrode lead part.

8. The nonaqueous electrolyte secondary battery according to claim 7, wherein the protective layer is disposed on the positive electrode current collector in an area beyond an area facing the negative electrode.

9. The positive electrode according to claim 1, wherein the amount of the inorganic particles is 90% to 99% by weight with respect to the total weight of the protective layer.

10. The positive electrode according to claim 1, wherein in the covered area, the inorganic particles are partially embedded in the positive electrode current collector.

* * * * *